United States Patent

[11] 3,554,481

| [72] | Inventor | Paul Brinduse<br>Anderson, Ind. |
|---|---|---|
| [21] | Appl. No. | 704,489 |
| [22] | Filed | Feb. 9, 1968 |
| [45] | Patented | Jan. 12, 1971 |
| [73] | Assignee | Lynch Corporation<br>Anderson, Ind.<br>a corporation of Indiana |

[54] WIND DAMPER ASSEMBLY FOR GLASSWARE FORMING MACHINES
10 Claims, 5 Drawing Figs.

[52] U.S. Cl. ............................................. 251/31,
65/164, 65/234, 65/300, 65/301
[51] Int. Cl. ................................................. C03b 9/00
[50] Field of Search ......................................... 65/157,
160, 161, 162, 163, 164, 300, 234, 301,
251/205, 326, 31; 137/(Inquired)

[56] References Cited
UNITED STATES PATENTS

| 3,170,670 | 2/1965 | Johnstone ................ | 251/326 |
| 3,272,612 | 9/1966 | Hamilton ................. | 65/300 |
| 3,463,193 | 8/1969 | Yost ...................... | 251/326 |

*Primary Examiner*—S. Leon Bashore
*Assistant Examiner*—Robert L. Lindsay, Jr.
*Attorney*—Molinare, Allegretti, Newitt & Witcoff ABSTRACT: A damper box for interposition between a wind source and a source of wind utilization wherein a slide-type damper plate is actuated by a cylinder and piston assembly. The piston spans the opening through the damper box whereby minimum space around the damper box is required for the damper plate actuating mechanism. The cylinder and piston assembly is actuated hydraulically under the control of a glassware forming machine timer.

INVENTOR.
PAUL BRINDUSE
BY Bair, Freeman &
Molinare
ATTORNEYS

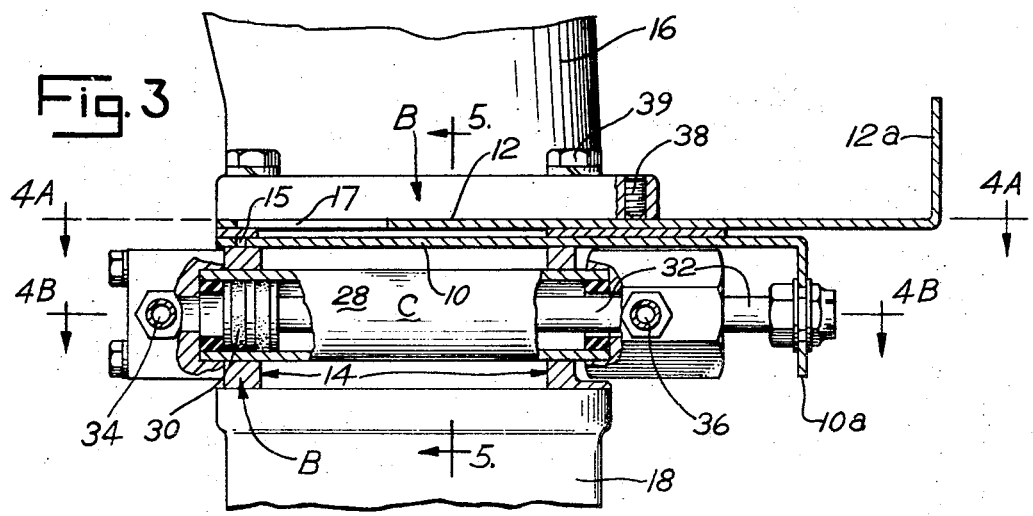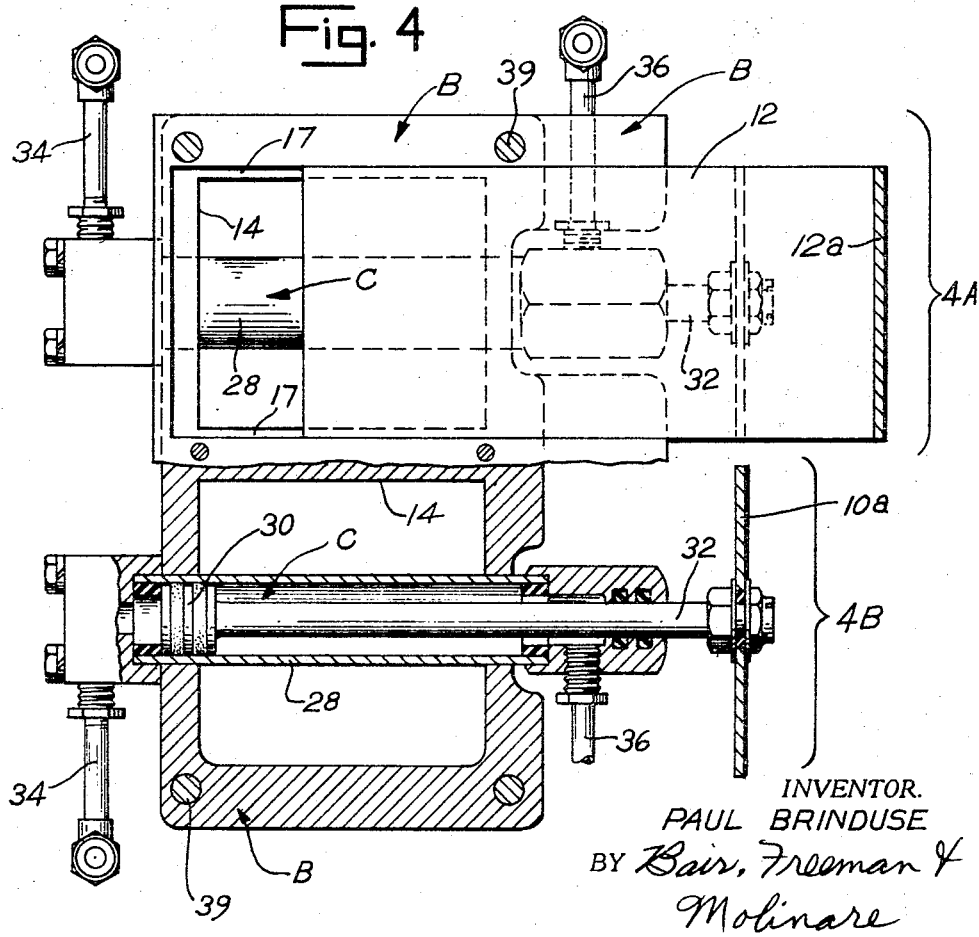

WIND DAMPER ASSEMBLY FOR GLASSWARE FORMING MACHINES

BACKGROUND OF THE INVENTION

Heretofore damper boxes have been interposed between a wind source and a source of wind utilization (such as various parts of glassware forming machine) but included butterfly type damper blades. Where these are used for glassware forming machines they become inoperative after a few months's use because they must undergo about a million cycles of operation during a 3 or 4-month period since glassware forming machines are usually operated 24 hours a day, 7 days a week, cycling in the neighborhood of once per second. When butterfly blades become inoperative, it becomes necessary to shut down the machine while the damper box is removed and replaced by another one having a new butterfly damper blade in it.

On the other hand I provide a slide-type damper plate together with a hydraulically actuated cylinder and piston assembly for actuating the same which is capable of many millions of cycles of operation, thus avoiding the necessity of frequent shutdowns for replacing the damper box.

BRIEF SUMMARY OF THE INVENTION

I provide a damper box which is so constructed as to have a slideway in which a slide-type damper plate may be moved from closed to opened position when wind is required, and from opened to closed position when wind is no longer required. The wind through the damper box is supplied to various parts of glassware molds, both blank molds and finish molds, and "shots" of wind are required at selected times during each cycle of operation. These shots are varied in duration depending on requirements at the particular outlet from the conduit leading to the source of wind utilization and accordingly I provide means for controlling the damper plates automatically in accordance with such requirements by connecting the actuating cylinder and piston assemblies to valves which are timer-controlled, that is, controlled by the glassware forming machine timer which is normally provided on all automatic glassware forming machines.

One object of the invention is to provide a damper box so designed that a damper plate is slidable therein between closed and opened positions, an actuating cylinder and piston assembly being provided to actuate the damper plate.

Another object is to mount the actuating cylinder and piston assembly in the damper box itself in such manner that it spans the width of the box, extending from side to side thereof, and is located in the windstream through the damper box.

Still another object is to provide an assembly in which a piston is located in a cylinder and a piston rod extends from one end of the cylinder and is operatively connected with the damper plate.

A further object is to provide the damper plate slidable in a plane substantially parallel to and adjacent the cylinder, the damper plate having a portion bent from the plane thereof toward the piston rod and connected thereto.

Still a further object is to provide means to actuate the piston and thereby the damper plate comprising a source of fluid pressure, a control valve between such source and opposite ends of the cylinder, and timer-controlled means for actuating the control valve at predetermined selected times during the cycle of operation of the glassware forming machine.

An additional object is to provide the damper box with a second slide-type damper plate which is manually movable to vary the amount of wind supplied through the damper box to the piston actuated damper plate.

Another additional object is to provide means for locking the second damper plate in a desired position.

With these and other objects in view, my invention consists in the construction, arrangement and combination of the various parts of my wind damper assembly, whereby the objects above contemplated are attained, as hereinafter more fully set forth, pointed out in my claims and illustrated in detail on the accompanying drawings, wherein:

BRIEF DESCRIPTION OF THE DRAWINGS

FIG. 3 is an enlarged vertical sectional view on the line 3—3 of FIG. 1 showing some parts in side elevation;

FIG. 4 is a horizontal sectional view partly on the line 4A—4A of FIG. 3 and partly on the line 4B—4B thereof as identified at the right side of FIG. 4.

DESCRIPTION OF THE PREFERRED EMBODIMENT

Figure 1:
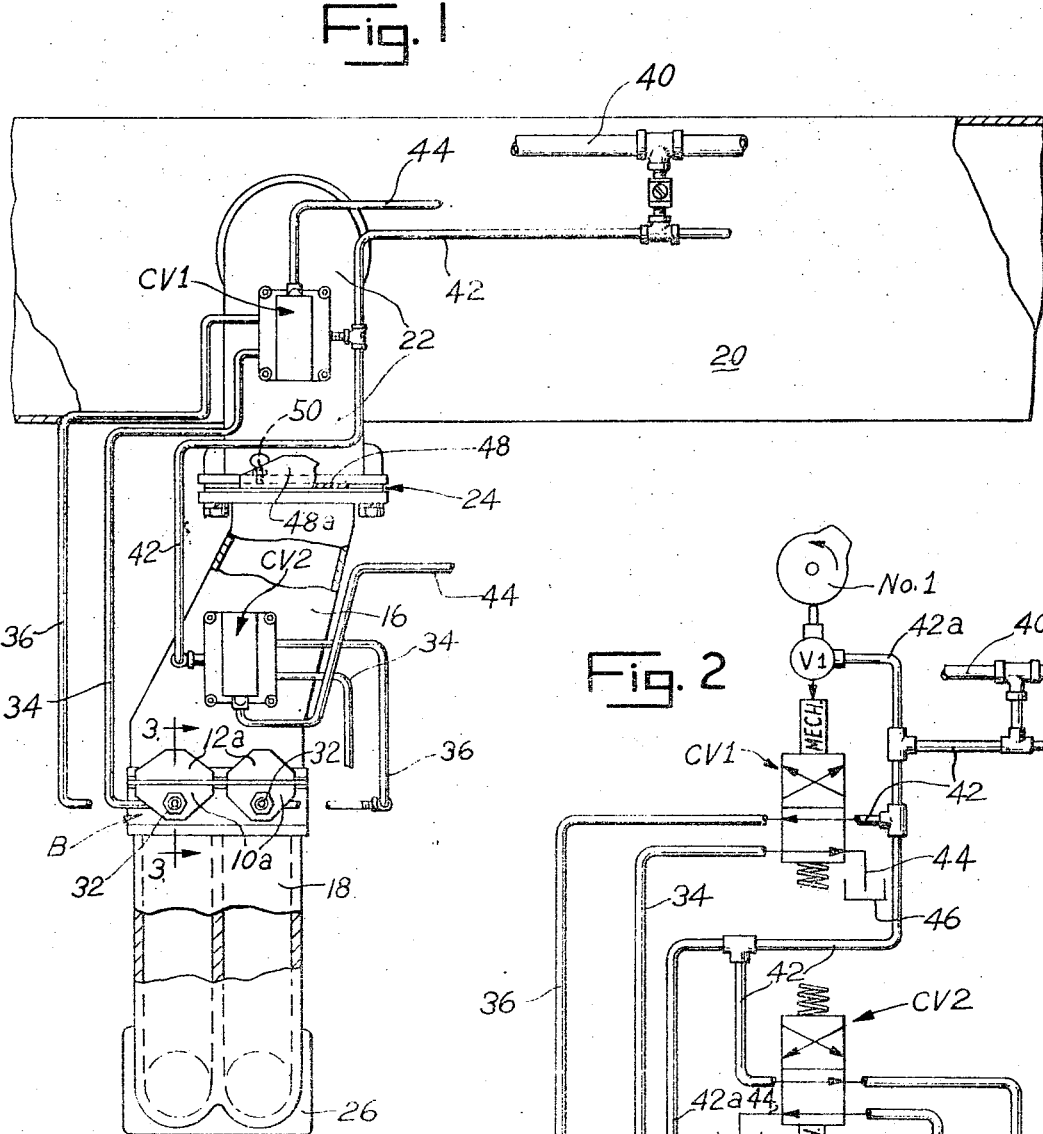
FIG. 1 is an elevation of a wind damper assembly embodying my invention and provided for a glassware forming machine manually adjustable dampers being also illustrated in connection with the assembly.

The preferred embodiment of my wind damper assembly is shown in FIG. 1 and comprises in general a damper box B, a pair of cylinder and piston assemblies C, automatic damper plates 10 and manual damper plates 12. The damper box B is provided with slide grooves 15 for the damper plate 10 and 17 for the damper plate 12 as shown in FIGS. 3 and 4.

Figure 5:
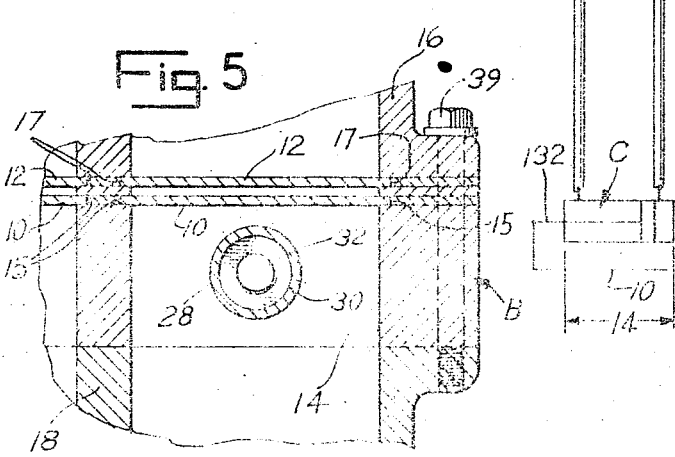
FIG. 5 is a vertical sectional view on the line 5—5 of FIG. 3.

The box B as shown in FIGS. 3 and 4 is designed with one or more rectangular damper box passageways 14 and is adapted to be interposed between a first conduit 16 leading from a wind source and a second conduit 18 leading to a source of wind utilization. Screws 39 are shown in FIGS. 3, 4 and 5 to hold the parts B, 16 and 18 assembled. A wind supply manifold 20 is illustrated as the source of wind supply and is connected by an elbow fitting 22 with the upper end of the second conduit 18, a second damper box 24 being interposed between the two. The second conduit 18 is illustrated as being of elbow character and as leading to a wind receiving manifold 26 of the glassware forming machine which in turn may lead to nozzles discharging against a mold or against were exposed and supported by a neck ring as shown in Youkers U.S. Pat. No. 2,874,516 as an example of a source of wind utilization.

Each cylinder assembly C comprises a cylinder 28, a piston 30 therein and a piston rod 32 as shown in detail in FIGS. 3, 4 and 5. The piston rods 32 are connected to flanges 10a of the automatic damper plates 10 where by motion of the pistons within the cylinders is translated into closing and opening motions of the damper plates. Hydraulic connections 34 and 36 are made to the inner and outer ends of the cylinders 28.

The manual damper plates 12 are provided with flanges 12a for convenience in serving as handles to slide them, and a setscrew 38 (see FIG. 3) is provided for locking each manual damper plate 12 in its selected position.

Figure 2:
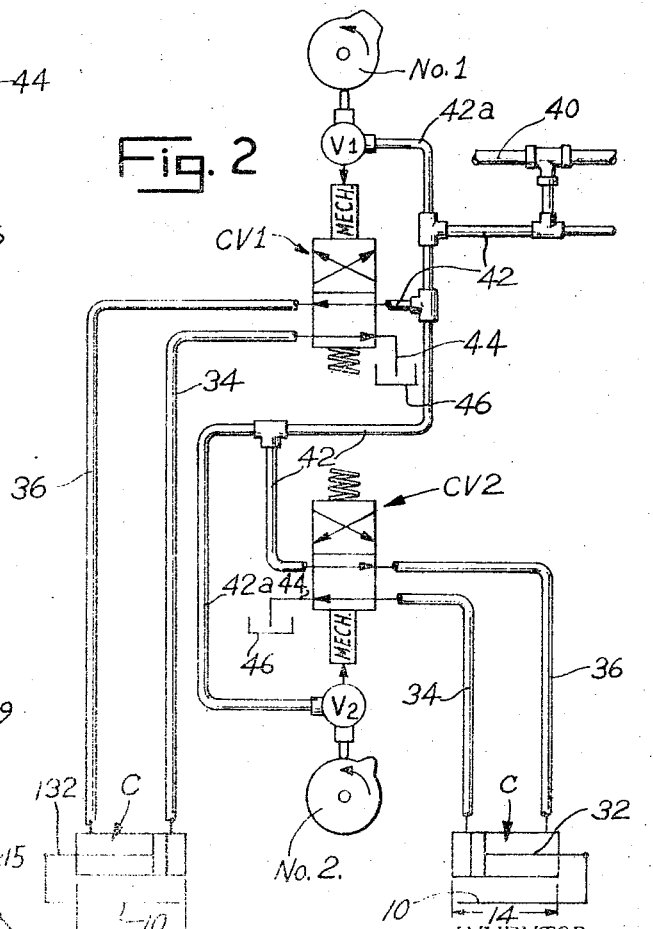
FIG. 2 is a diagrammatic view involving a pair of automatic dampers embodying my invention and timer-controlled means actuating control valves for the automatic dampers.

As shown diagrammatically in FIG. 2, the hydraulic connections 34 and 36 extend to control valves CV1 and CV2 which are supplied with hydraulic fluid under pressure from a hydraulic fluid line 40 and branch lines 42. The valves are normally in the positions illustrated, and may be reversed in position by the opening of valves V1 and V2 respectively supplied with hydraulic fluid under pressure from extension lines 42a of the branch lines 42. The valves V1 and V2 are operable to mechanically (as distinguished from manually) reverse the valves CV1 and CV2 from the positions shown in FIG. 2 when actuated by timer cams No. 1 and No. 2 respectively. These timer cams are designed and adjusted for opening the valves V1 and V2 at selected portions of operating cycles of the glassware forming machine and for the periods desired for furnishing the desired amount of wind to the various elements of the machine or the glassware being formed in accordance with practices well known in the glassware forming art. The valves CV1 and CV2 are also provided with return lines 44 to the storage tank 46 as shown diagrammatically in FIG. 2.

In addition to the automatic control of the damper plates 10, the manual damper plates 12 permit adjustment of the volume of wind flowing through each damper box passageway 14 as required for the particular part of the machine or glassware where the wind is discharged. After adjustment, the plates 12 may be locked by tightening the setscrews 38.

The damper box 34 shown in FIG. 1 has a manually controllable master damper plate 48 slidable therein and provided with a handle flange 48a. It may be locked in position by a setscrew 50 and can be used as a primary control preceding the two manual damper plates 12.

From the foregoing description it will be obvious that I have provided a relatively simple slidable type of damper plate and simple compact mechanism for actuating the same.

Some changes may be made in the construction and arrangement of the parts of my wind damper assembly without departing from the real spirit and purpose of my invention, and it is my intention to cover by my claims any modified forms of structure or use of mechanical equivalent which may reasonably be included within their scope.

I claim:

1. An improved wind damper assembly for use with glassware forming machines requiring shots of wind at selected times during each cycle of operation, the improved wind damper assembly comprising: a damper box interposed between a first conduit leading from a wind source and a second conduit leading to a source of wind utilization, said damper box having a passageway defined therein which connects said first conduit with said second conduit so that a wind stream may pass from said source of wind, through said first conduit, said second conduit to said source of wind utilization, the damper box also having a slideway formed therein across said passageway; a slide-type damper plate disposed in said slideway and movable between a closed position wherein the damper plate blocks flow through said passageway and an open position wherein wind may pass through said passageway; an actuating cylinder and piston assembly including a cylinder extending across said passageway and being supported adjacent to each of its ends by said damper box, with the diameter of said cylinder being less than the width of said passageway, and including a piston, having a piston rod attached thereto, said piston being disposed in said cylinder for reciprocal movement therein between a first position and a second position; means for moving said piston from its first position to its second position and from its second position to its first position at selected times during the cycles of operations of the glassware forming machine with which the damper assembly is used; and means operatively connecting said piston with said damper plate so that movement of said piston from its first position to its second position causes said damper plate to be moved from its closed position to is its open position and so that movement of said piston from its second position to its first position causes said damper plate to be moved from its open position to its closed position.

2. A wind damper assembly according to claim 1 wherein said damper plate includes means to slide in a plane substantially parallel to and adjacent said cylinder, and has a portion bent from the plane thereof toward said piston rod, said last portion being connected to said piston rod.

3. A wind damper assembly according to claim 1 wherein the means to move said piston and thereby said damper plate comprises a source of fluid pressure, a control valve between said source of fluid pressure and the opposite ends of said cylinder, said control valve normally causing said piston to be in its first position; and timer-controlled means for actuating said control valve to cause said piston to move from its first position to its second position and thereafter back to its first position at selected times during the cycles of operation of the glassware forming machine with which said damper assembly is used.

4 A wind damper assembly according to claim 1 wherein said damper box has a second slideway, and a second slide type damper plate slidable therein between closed and opened positions, said second mentioned damper plate being manually movable to vary the amount of wind admitted from said first conduit to said first mentioned damper plate.

5. A wind damper assembly according to claim 4 wherein means is provided to lock said second damper plate in a desired position.

6. A wind damper assembly according to claim 5 wherein said last means comprises a setscrew carried by said damper box and engageable with said second damper plate.

7. A wind damper assembly according to claim 1 wherein the longitudinal axis of said cylinder is perpendicular to the axis of said passageway; wherein one end of said piston rod extends from one end of the said cylinder; and wherein said one end of said piston rod is operatively connected with said damper plate.

8. A wind damper assembly according to claim 7 wherein said damper plate slides in a plane substantially parallel to and adjacent said cylinder and has a portion bent from the plane thereof toward said piston rod, said ls last portion being connected to said one end of said piston rod.

9. A wind damper assembly according to claim 8 wherein the means to move the said piston and thereby said damper plate comprises a source of fluid pressure, a control valve between said source of fluid pressure and opposite ends of said cylinder, said control valve normally causing the said piston to be in its first position; and timer-controller means for actuating said control valve to cause said piston to move from its first position to its second position and thereafter back to its first position at selected times during its cycles of operation of the glassware forming machine with which said damper assembly is used.

10. A wind damper assembly according to claim 9 wherein said damper box has a second slideway, and a second slide type damper plate slideable therein between closed and open positions, said second damper plate being manually movable between closed and open positions to vary the amount of wind admitted from said first conduit to said first damper plate.